(12) United States Patent
Olsen et al.

(10) Patent No.: US 7,782,383 B2
(45) Date of Patent: Aug. 24, 2010

(54) NOISE AND PARASITIC CAPACITANCE REDUCTION FOR 1T PIXEL CMOS IMAGE SENSORS

(75) Inventors: Alf Olsen, Oslo (NO); Espen A Olsen, Irvine, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 686 days.

(21) Appl. No.: 11/764,307

(22) Filed: Jun. 18, 2007

(65) Prior Publication Data

US 2008/0309800 A1 Dec. 18, 2008

(51) Int. Cl.
*H04N 3/14* (2006.01)
*H01L 31/062* (2006.01)
*H01L 27/00* (2006.01)

(52) U.S. Cl. ............... 348/309; 257/292; 250/208.1

(58) Field of Classification Search .................. None
See application file for complete search history.

(56) References Cited

U.S. PATENT DOCUMENTS 5,892,540 A * 4/1999 Kozlowski et al. ......... 348/300
6,750,912 B1 * 6/2004 Tennant et al. ............. 348/300
7,183,531 B2 2/2007 Olsen et al.
7,282,685 B2 * 10/2007 Boemler .................. 250/208.1
7,388,187 B1 * 6/2008 Liu et al. .................. 250/214.1
7,476,836 B2 * 1/2009 Boemler .................. 250/208.1
2006/0214085 A1 9/2006 Olsen et al.
2006/0231733 A1 10/2006 Boemler

* cited by examiner

*Primary Examiner*—Justin P Misleh
(74) *Attorney, Agent, or Firm*—RatnerPrestia

(57) ABSTRACT

Methods and circuits for reducing noise for a passive pixel sensor (PPS) array of an image sensor are described. A noise reduction circuit includes a noise reduction integrator circuit configured to detect a potential voltage of a column line of the PPS array and generate a potential voltage substantially equal to the potential voltage of the column line. The noise reduction circuit also includes a conductor line oriented longitudinally along the column line and configured to receive the generated potential voltage from the noise reduction integrator circuit. The conductor line is placed at a potential voltage that is the same as the potential voltage of the column line. A parasitic capacitance formed between the conductor line and the column line is substantially reduced.

13 Claims, 5 Drawing Sheets

NOISE AND PARASITIC CAPACITANCE REDUCTION FOR 1T PIXEL CMOS IMAGE SENSORS

FIELD OF THE INVENTION

The present invention relates to the field of CMOS imagers and, more particularly, to methods and circuits for noise and parasitic capacitance reduction for a passive pixel sensor (PPS) array.

BACKGROUND OF THE INVENTION

Image sensors find applications in a wide variety of fields, including machine vision, robotics, guidance and navigation, automotive applications and consumer products. In many smart image sensors, it is desirable to integrate on-chip circuitry to control the image sensor and to perform signal and image processing on the output image. Charge-coupled devices (CCDs), which have been one of the dominant technologies used for image sensors, however, do not easily lend themselves to large scale signal processing and are not easily integrated with complementary metal oxide semiconductor (CMOS) circuits.

Both passive pixel sensors (PPS) and active pixel sensors (APS) may be made compatible with CMOS technologies. Both PPS and APS are often arranged as arrays of elements, that may be read out, for example, one row at a time. Each row can be read out at one time, driven and buffered for sensing by a readout circuit. PPS include a single transistor (1T) within the pixel unit cell and an amplifier per column located outside of the array. The single transistor is used as a charge gate for switching the contents of the pixel to the column amplifiers. APS includes an amplifier per pixel within the pixel. The in-pixel amplifier of the APS typically converts the pixel output signal to a low impedance and may provide an output signal that is less sensitive to noise on a pixel-by-pixel basis. APS commonly have four transistors (4T), but other configurations (for example, 3T and 5T) are also known. APS have increased readout sensitivity as compared with PPS.

There is interest in manufacturing smaller image sensors with higher spatial resolution, for example by making the pixels smaller. Smaller pixels, however, typically result in reduced photosensitive areas and produce higher image noise and/or poor low light performance. Although APS provide reduced noise pick-up, APS include more transistors within the pixel and thus have a reduced fill factor (a ratio of pixel size over active photosensitive area) as compared with PPS. PPS, on the other hand, may achieve a high fill factor, but typically suffer from a large parasitic capacitance due to the connection lines throughout the pixel array and noise coupling from the substrate through this capacitance.

BRIEF DESCRIPTION OF THE DRAWINGS

The invention is best understood from the following detailed description when read in connection with the accompanying drawing. Included in the drawing are the following figures.

DETAILED DESCRIPTION OF THE INVENTION

In the following detailed description, reference is made to the accompanying drawings which form a part hereof, and which illustrate specific embodiments of the present invention. These embodiments are described in sufficient detail to enable those of ordinary skill in the art to make and use the invention. It is also understood that structural, logical or procedural changes may be made to the specific embodiment disclosed without departing from the spirit and scope of the present invention.

Figure 1:
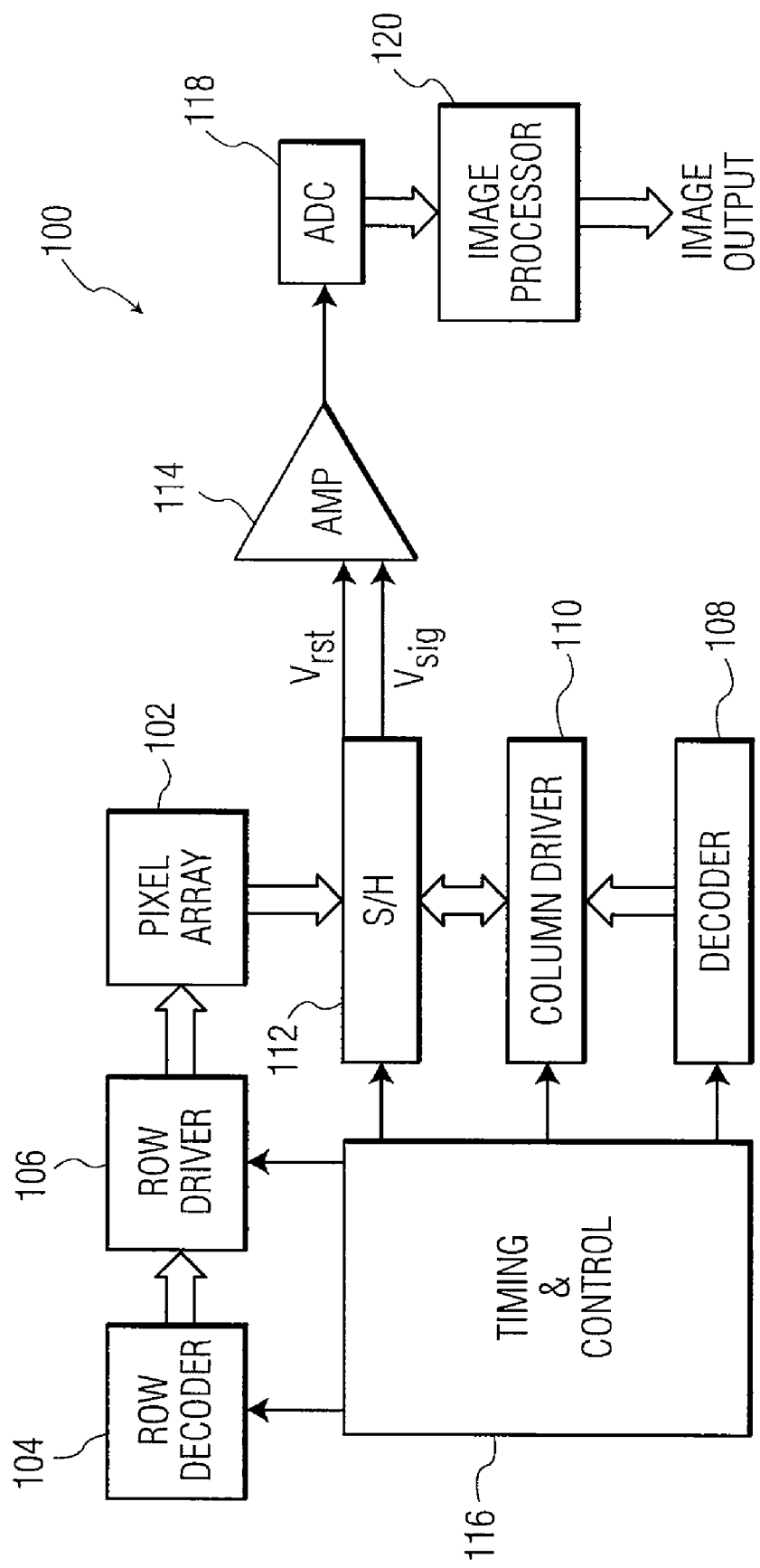
FIG. 1 is a block diagram of an image sensor.

FIG. 1 illustrates a block diagram for CMOS imager 100. The imager 100 includes pixel array 102. The pixel array 102 includes a plurality of pixels arranged in a predetermined number of columns and rows. The pixels of each row in array 102 are all turned on at the same time by a row select line and the pixels of each column are selected for output by a column select line. A plurality of row and column lines are provided for the entire array 102.

The row lines are selectively activated by row driver 106 in response to row address decoder 104 and the column select lines are selectively activated by column driver 110 in response to column address decoder 108. Thus, a row and column address is provided for each pixel. The CMOS imager 100 is operated by control circuit 116, which controls address decoders 104, 108 for selecting the appropriate row and column lines for pixel readout, and row and column driver circuitry 106, 110, which apply driving voltages to the drive transistors of the selected row and column lines.

Each column of pixel array 102 contains sample and hold circuitry (S/H) 112 including sample and hold capacitors and switches associated with column driver 110 that read and store pixel reset signal $V_{rst}$ and pixel image signal $V_{sig}$ for selected pixels. A differential signal ($V_{rst}$-$V_{sig}$) is produced by differential amplifier 114 for each pixel, which is digitized by analog-to-digital converter 118 (ADC). The analog-to-digital converter 118 supplies the digitized pixel signals to image processor 120, which forms and outputs a digital image.

Figure 2A:
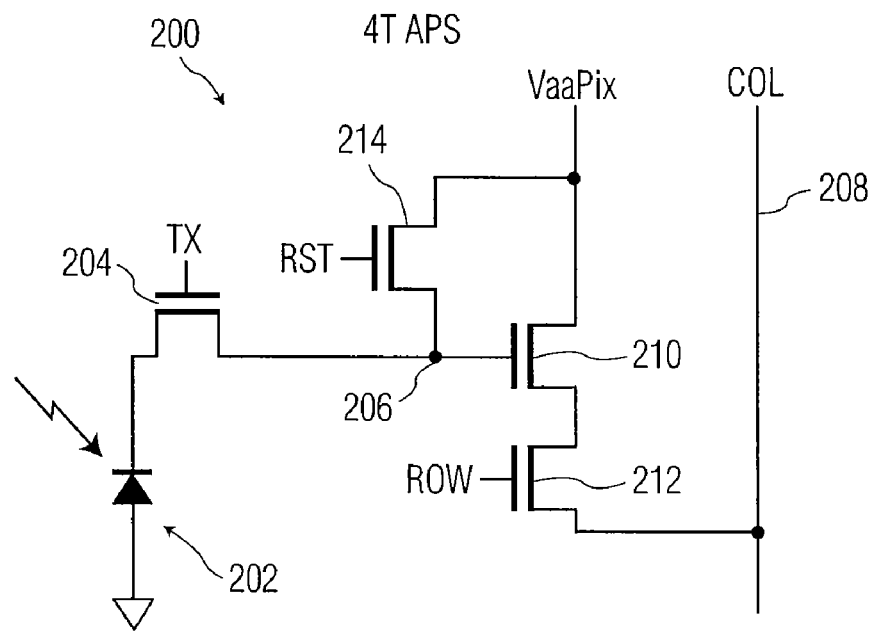
FIG. 2A is a schematic diagram of an APS pixel cell in an image sensor that generates analog signals.

FIG. 2A shows a 4T APS pixel cell, designated generally as 200, and used in an imager such as CMOS imager 100 illustrated in FIG. 1. The APS pixel cell 200 includes photosensor 202, floating diffusion region 206, transfer transistor 204, reset transistor 214, source follower transistor 210 and row select transistor 212. Photosensor 202 is shown as a photodiode, but other forms of photosensors may be used, for example, a photogate.

Photosensor 202 is connected to floating diffusion region 206 by transfer transistor 204, when transfer transistor 204 is activated by control signal TX. Reset transistor 214 is connected between floating diffusion region 206 and array pixel supply voltage $V_{aaPix}$. A reset control signal RST is used to activate reset transistor 214, which resets floating diffusion region 206 to reset voltage $V_{RST}$.

Source follower transistor 210 has its gate connected to floating diffusion region 206 and is connected between pixel supply voltage $V_{aaPix}$ and row select transistor 212. Source follower transistor 210 converts the charge stored at floating diffusion region 206 into an electrical output voltage signal. Row select transistor 212 is controllable by a row select signal for selectively connecting source follower transistor 210 and its output voltage signal to column line 208 of a pixel array.

When APS circuit 200, i.e. APS pixel cell 200, is used in CMOS imager 100 (FIG. 1), each pixel outputs reset voltage $V_{RST}$, provided after reset of floating diffusion region 206 and pixel output voltage $V_{sig}$, provided after photogenerated charges are transferred to floating diffusion region 206 by transfer transistor 204. These signals are subtracted, i.e. $V_{rst}$-$V_{sig}$, by differential amplifier 114 (FIG. 1) for conventional correlated double sampling. The resulting signal is digitized and represents the pixel image signal which is collected with pixel image signals from other array pixels.

Source follower transistor 210, in APS pixel cell 200, transforms the pixel output to a low impedance voltage source. Accordingly, source follower transistor 210 may reduce incomplete charge collection, described further below, and noise pick-up due to parasitic capacitance connected to the transmission line formed throughout the APS array.

Figure 2B:
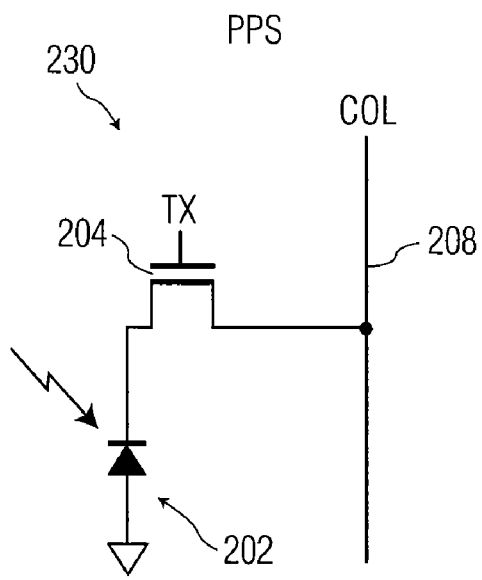
FIG. 2B is a schematic diagram of a PPS pixel cell in an image sensor that generates analog signals.

FIG. 2B shows PPS pixel cell 230 used in an imager, such as CMOS imager 100 (FIG. 1). The PPS pixel cell 230 includes photosensor 202 and transfer transistor 204. As in the case of APS pixel cell 200 (FIG. 2A), the illustrated PPS pixel cell 230 uses a photodiode, but other forms of photosensors may be used. When transfer transistor 204 is activated by control signal TX, photosensor 202 is connected to (and reads collected charge to) column line 208.

Because PPS are configured as a simple circuit (i.e., a 1T circuit), the pixel sizes can be very small with large photosensitive areas. Metal wiring through the PPS pixel array includes one horizontal wire for the transistor (for row selection) and one vertical wire for the column signal. In addition, a signal lag for PPS circuits is minimal because the column line is kept permanently at high voltage. The capacitance on the column line and an amplifier feedback loop (described below with respect to FIG. 3) may be employed to keep the column line at a constant voltage that does not drop below the pin photodiode voltage. Keeping the column line voltage above the pin photodiode voltage prevents residual charge from remaining on the photodiode.

One of the problems with traditional PPS circuits is their lack of readout sensitivity. It is known to use PPS circuits that include integrator amplifiers to improve readout sensitivity. PPS circuits, however, still have noise problems. The PPS circuit does not have a low output impedance (as compared with APS circuit 200 in FIG. 2A) and thus the PPS circuit is prone to a large parasitic capacitance given by the connection lines throughout the pixel array, forming a transmission line, and noise coupling from the substrate through this capacitance.

In PPS circuits, charge from the PPS pixel cell is typically collected on a feedback capacitor of a column amplifier (described below with respect to FIG. 3). At the input terminal to the feedback capacitor, however, there is also typically a large parasitic capacitance caused by the long transmission line. The charge from the PPS pixel cell may be divided between the feedback capacitor and the parasitic capacitance, thus, causing an incomplete charge collection by the feedback capacitor. Incomplete charge collection is typically not a substantial issue for APS circuits, because a voltage at an output terminal of the source follower stage (formed by source follower transistor 210 (FIG. 2A) and an external load), rather than a charge, is typically transferred to capacitors of the S/H circuitry, for example S/H 112 (FIG. 1).

Figure 3:
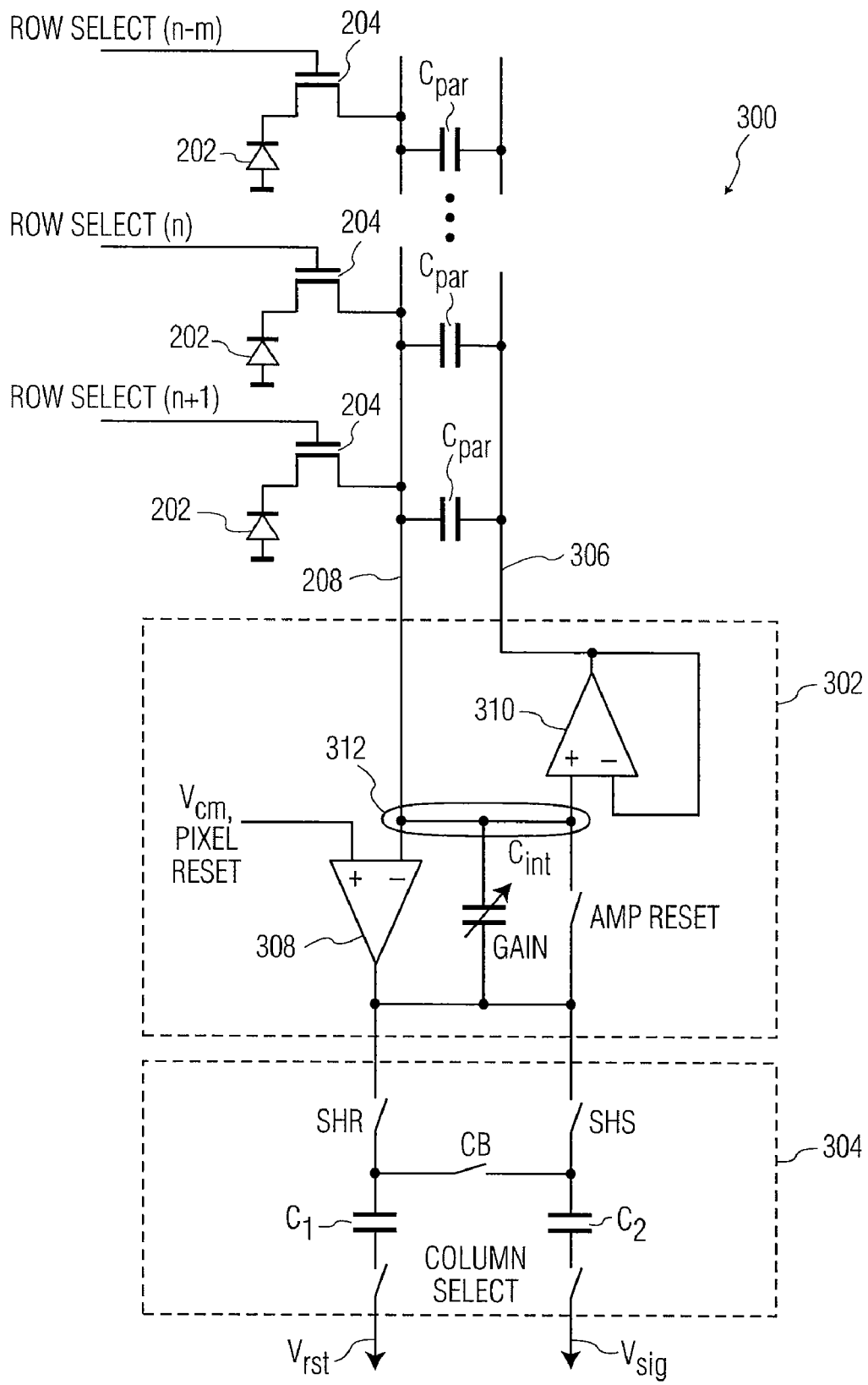
FIG. 3 is a schematic diagram illustrating a pixel array column noise reduction circuit according to an embodiment of the invention.

FIG. 3 illustrates a schematic diagram of a PPS CMOS circuit, designated generally as 300, including a noise reduction integrator circuit 302, according to an embodiment of the invention. For simplicity, FIG. 3 illustrates a single column from pixel array 102 (FIG. 1), and shows three PPS pixel cells 230 of the column out of many in the array. PPS pixel cells 230 are shown for rows n−m, n and n+1, respectively. As illustrated in FIG. 3, the circuit includes PPS pixel cells 230, active shield 306 adjacent to column line 208, noise reduction integrator circuit 302, and S/H circuit 304 for reading and storing pixel reset signal $V_{rst}$ and pixel image signal $V_{sig}$ for selected pixels.

Imager 100 of FIG. 1 may be modified, for example, to include, for each column of pixel array 102, active shield 306 adjacent to a column line and a noise reduction integrator circuit 302 between both a column line and active shield 306 and the input of S/H circuit 112 on the other side. S/H circuit 112 (FIG. 1) may be the same as S/H circuit 304 of FIG. 3. In another embodiment, S/H circuit 304 may be replaced by any other circuit suitable for removal of an amplifier offset signal.

Noise reduction integrator circuit 302 includes feedback capacitor (i.e., charge integration capacitor) $C_{int}$, amplifier 308 and buffer amplifier 310. Noise reduction integrator circuit 302 maintains constant voltage on column line 208 and integrates charge received from PPS pixel cell 230 via column line 208 onto feedback capacitor $C_{int}$. This results in a voltage increase at an output node of integrator circuit 302.

Buffer amplifier 310 represents a voltage holder that continuously detects column line 208 potential and transfers the potential rapidly to active shield 306. Buffer amplifier 310 works in parallel with amplifier 308 to detect and transfer the potential of column line 208 to active shield 306. In one embodiment, a bandwidth of buffer amplifier 310 is greater than or equal to the bandwidth of amplifier 308.

Active shield 306 is a conductive layer formed between column line 208 and a substrate (not shown). Column line 208 is thus shielded from the substrate by the conductive layer (i.e. active shield 306). Although there is typically some parasitic capacitance throughout the pixel array, because column line 208 is formed on top of active shield 306, the parasitic capacitance seen by column line 208 is the parasitic capacitance $C_{par}$ between column line 208 and active shield 306.

Active shield 306 is placed at the same potential as column line 208 (via the output of buffer amplifier 310), and any parasitic capacitance $C_{par}$ seen on column line 208 is substantially removed. Because both terminals (i.e. of column line 208 and active shield 306) are at the same potential, there is no collection of charge by $C_{par}$, and the capacitance of $C_{par}$ is substantially equal to zero. In addition, active shield 306 shields column line 208 from influence by substrate noise and, to some degree, crosstalk from neighboring column lines (not shown).

Although noise reduction integrator circuit 302 adds two amplifiers to each column, the total number of transistors is greatly reduced, as compared with APS pixel cell 200 (FIG. 2A). The many transistors shown in FIG. 2A are removed from the pixel circuits shown in FIG. 3. A floating diffusion in the 4T pixel circuit may no longer represent a limiting factor in dynamic range. In addition, high dynamic techniques, with multiple exposures and nondestructive read-out, may be easily implemented because the photocharge is stored on feedback capacitor $C_{int}$ of noise reduction integrator circuit 302, rather than on a floating diffusion as in APS pixel cell 200 (FIG. 2A).

In PPS CMOS circuit 300, input node 312 acts as a floating diffusion region, similar to floating diffusion region 206 of APS pixel cell 200 (FIG. 2A). Input node 312, accordingly, becomes a common floating diffusion region for all PPS pixel cells 230 in a column.

When control signal TX (i.e. row select signal in FIG. 3) is activated, feedback capacitor $C_{int}$ collects charge from the corresponding PPS pixel cell 230. Photosensor 202 is reset when amplifier 308 is in a reset state and control signal TX is activated. A pixel reset signal, $V_{rst}$, is read from the PPS pixel cell 230, by resetting amplifier 308 without activating control signal TX. The pixel reset signal is sampled on sampling capacitor $C_1$. The pixel reset signal is equal to the amplifier reset signal, which is also provided on an output node of amplifier 308.

In a gain state, amplifier 308 is released from its reset state, control signal TX is activated and charge flows from corresponding photosensor 202 to feedback capacitor $C_{int}$. In the gain state, feedback capacitor $C_{int}$ becomes a virtually large capacitance, as seen from input node 312 of amplifier 308, due to a loop gain of amplifier 308, and, ideally, all charge is collected on $C_{int}$. A pixel image signal, $V_{sig}$, i.e. the output signal of amplifier 308 (collected charge divided by a real capacitance of $C_{int}$), is sampled on sampling capacitor $C_2$. $V_{rst}$ and $V_{sig}$ are used in correlated double sampling to remove a reset noise offset from the pixel image signal. A difference between $V_{rst}$ and $V_{sig}$ may be amplified, for example, by differential amplifier 114 and fed to ADC 118 (FIG. 1).

Figure 4:
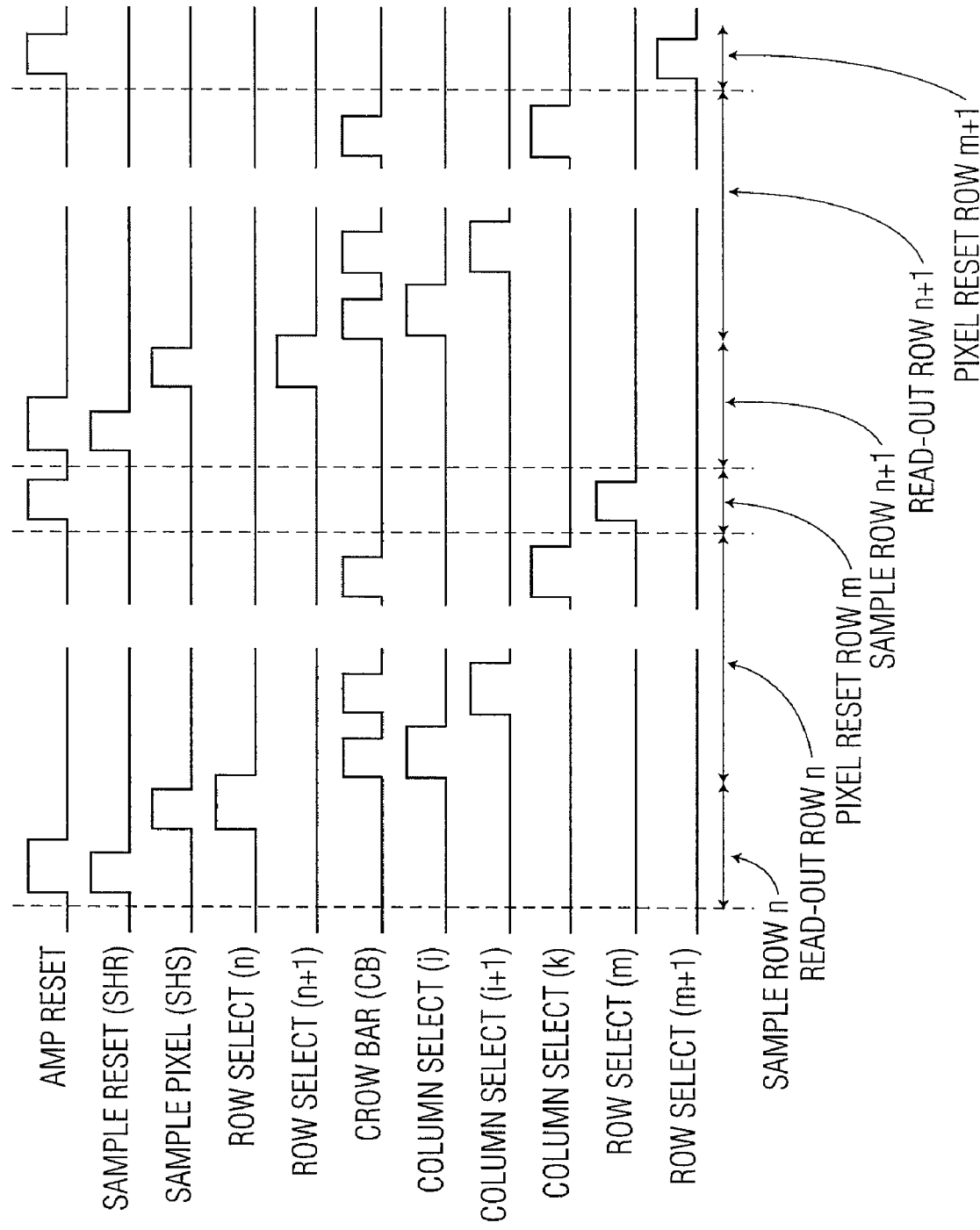
FIG. 4 is a timing diagram of control signals for the circuit shown in FIG. 3.

FIG. 4 illustrates a timing diagram of control signals of PPS circuit 300 of FIG. 3 for reading out pixel rows according to a correlated double sampling (CDS) method. In FIG. 4, control signals, namely amp reset, sample reset (SHR), sample pixel (SHS), row select, crow bar (CB), and column select, correspond to respective switches of amp reset, SHR, SHS, row select, CB and column select in FIG. 3. Row select corresponds to control signal TX signal of FIG. 2B. In FIG. 4, a high signal corresponds to closing a corresponding switch. A high row select signal opens the TX gate (corresponding to transfer transistor 204) of PPS pixel cell 230, which transfers the charge from photosensor 202 to noise reduction integrator circuit 302, and, at the same time, acts as a row selection. In general, to perform CDS, S/H circuit 304 stores pixel reset signal $V_{rst}$ and pixel image signal $V_{sig}$ for pixels of selected rows of PPS pixel cells 230 using noise reduction integrator circuit 302. Procedures for pixel reset row, pixel sample row and pixel read-out are performed in order to acquire and store $V_{rst}$ and $V_{sig}$ for each row. Referring to FIGS. 3 and 4, a description of these procedures are provided below.

During pixel reset row, such as pixel reset row m, photosensors 202 of a particular row are reset. Amplifier 308 is reset by setting the amp reset signal to a high value. A reset voltage is transferred to the respective photosensors 202 by activation of the corresponding row select signal. Exposure of photosensors 202 to the reset voltage occurs when the row select signal is set to a low value, and charge generated by light starts accumulating on photosensors 202 that are isolated from the transmission line because the TX gate is closed.

After resetting PPS pixel cells 230, a row is sampled, for example, sample row n+1. At the end of the exposure period for a row, for example, row n+1, amplifier 308, the transmission line (i.e. the parasitic capacitance), and $C_{int}$ are reset again by applying a high amp reset signal, without opening any of the corresponding TX gates (i.e. row select is a low signal). An SHR pulse is applied and the reset signal $V_{rst}$ is sampled and held by sampling capacitor $C_1$ of S/H circuit 304.

Then amplifier 308 is released from its reset state, and the corresponding TX gate is opened (i.e. row select is a high signal). In this state, charge is transferred from respective photosensor 202 to feedback capacitor $C_{int}$. After amplifier 308 settles, an output signal of amplifier 308 is sampled on second sampling capacitor $C_2$ of S/H circuit 304 by applying a high SHS pulse for a sampling period. The SHS pulse causes pixel image signal $V_{sig}$ to be sampled and held by sampling capacitor $C_2$ of S/H circuit 304. This is referred to as CDS, because a reset noise on sampling capacitors $C_1$ and $C_2$ are correlated.

In order to read out a row (for example, read-out row n+1), CDS is performed by removing the reset signal, $V_{rst}$, from the pixel image signal $V_{sig}$. Columns are sequentially selected by activating a respective column select signal, along with a sequentially activated CB pulse, to transfer the voltages from sampling capacitors $C_1$ and $C_2$ to a next amplifier stage, for example differential amplifier 114 (FIG. 1). In this manner, a reset noise offset is removed from the pixel image signal.

Another row is then ready to be read, starting with a reset of feedback capacitor $C_{int}$ and the transmission line. In between readout of rows, for example, row j and row j+1, photosensors 202 in row j+k are reset as described above. After reading rows j+1 through k, row k has then accumulated a charge during a time corresponding to k−j rows times a readout time per row.

Figure 5:
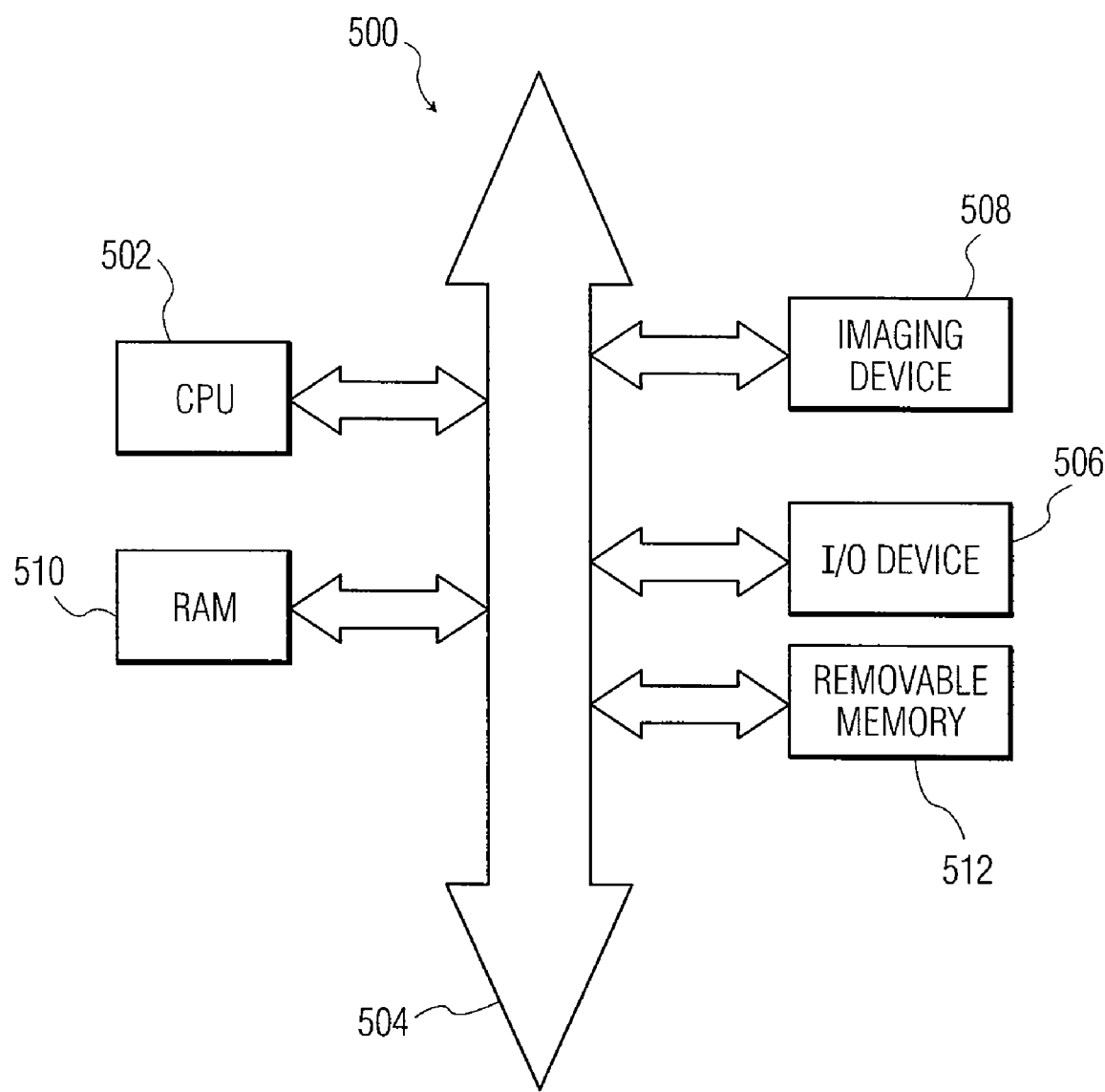
FIG. 5 is a block diagram of a processing system incorporating at least one imaging device constructed in accordance with an embodiment of the invention.

FIG. 5 shows a typical processor system, designated generally as 500, which is modified to include imaging device 508 and constructed in accordance with an embodiment of the invention. The processor-based system 500 is exemplary of a system having digital circuits that may include image sensor devices. Without being limiting, such a system may include a computer system, camera system, scanner, machine vision, vehicle navigation, video phone, surveillance system, auto focus system, star tracker system, motion detection system, image stabilization system, and other systems relying on an image input.

System 500, for example, a camera system, generally includes central processing unit (CPU) 502, such as a microprocessor, which communicates with input/output (I/O) device 506 over bus 504. Imaging device 508 also communicates with CPU 502 over bus 504. The processor-based system 500 also includes random access memory (RAM) 510, and may include removable memory 512, such as a flash memory. Memory 512 may also communicate with CPU 502 over bus 504. The imaging device 508 may be combined with a processor, such as a CPU, digital signal processor, or microprocessor, with or without memory storage, on a single integrated circuit or on a separate chip. It is also possible to integrate CPU 502, RAM 510 and imaging device 508 on the same integrated circuit chip.

It should be appreciated that other embodiments of the invention include an imager according to embodiments of the invention as illustrated in FIG. 3 formed on an integrated circuit chip. A passive pixel sensor (PPS) array that includes passive pixel cells, such as passive pixel cells 230 (FIG. 2B), noise reduction integration circuit 302 and S/H circuit 304 may be formed on the integrated circuit chip. As described above, S/H circuit 304 sample and hold a reset signal and a pixel image signal received from noise reduction integration circuit 302 to produce an adjusted pixel signal. Noise reduction integration circuit 304 is configured to generate potential voltages substantially equal to the respective potential voltages of column lines 208 of the PPS array. Conductor lines 306 may be formed on the integrated circuit chip, where conductor lines 306 receive the respective generated potential voltages from noise reduction integration circuit 302. Conductor lines 306 are generally oriented longitudinally in locations corresponding to the respective column lines 208. Column lines 208 may be formed on top of the respective conductor lines 306, where column lines 208 transmit respective potential voltages from the pixel array to noise reduction integration circuit 302. In addition, connections from noise reduction integration circuit 302 to the S/H circuit 304 may be formed.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A noise reduction circuit for a passive pixel sensor (PPS) array of an image sensor, the noise reduction circuit comprising:
a noise reduction integrator circuit configured to detect a potential voltage of a column line of the PPS array and generate a potential voltage substantially equal to the potential voltage of the column line; and
a conductor line oriented longitudinally along the column line and configured to receive the generated potential voltage from the noise reduction integrator circuit,
wherein the conductor line is placed at a potential voltage that is the same as the potential voltage of the column line.

2. The noise reduction circuit according to claim 1, wherein the conductor line is formed on a substrate and the column line is formed on top of the conductor line.

3. The noise reduction circuit according to claim 2, wherein a parasitic capacitance is formed between the column line and the conductor line, a charge collection by the parasitic capacitance being substantially reduced by the placement of the conductor line at the potential voltage that is the same as the potential voltage of the column line.

4. The noise reduction circuit according to claim 1, wherein the noise reduction integrator circuit comprises:
a buffer amplifier having an input node coupled to the column line to receive the potential voltage from the column line and an output node coupled to the conductor line to provide the generated potential voltage to the conductor line,
wherein the buffer amplifier detects the potential voltage of the column line and generates the potential voltage substantially equal to the potential voltage of the column line.

5. The noise reduction circuit according to claim 4, the noise reduction integrator circuit further comprising:
an amplifier having an first input node coupled to the column line for receiving the potential voltage from the column line and a second input node for receiving a reset voltage, the first input node being coupled to the input node of the buffer amplifier, the received potential voltage corresponding to a charge collected by one or more passive pixel sensors of the PPS array; and
a charge integration capacitor coupled between the first input node and an output node of the amplifier,
wherein the noise reduction integrator circuit integrates the collected charge onto the charge integration capacitor and generates an integrator output signal onto the output node of the amplifier.

6. The noise reduction circuit according to claim 5, further comprising a reset switch coupled between the first input node and the output node of the amplifier and in parallel with the charge integration capacitor for applying a high voltage, the high voltage providing the reset voltage to first and second terminals of the charge integration capacitor to discharge the charge integration capacitor, the reset voltage used to produce a pixel reset voltage signal at the output node of the amplifier as the integrator output signal.

7. The noise reduction circuit according to claim 1, the integrator output signal including one of a pixel reset voltage signal or a pixel image signal.

8. The noise reduction circuit according to claim 7, further comprising:
a sample and hold circuit configured to receive and store the pixel reset voltage signal and the pixel image signal on respective first and second capacitors, the sample and hold circuit generating a differential signal from the stored pixel reset voltage pixel image signals.

9. An imager comprising:
a passive pixel sensor (PPS) array formed on an integrated circuit chip, the PPS array including passive pixel cells;
a noise reduction integration circuit and a sampling circuit formed on the integrated circuit chip, for sampling and holding a reset signal and a pixel image signal to produce an adjusted pixel signal, the noise reduction integration circuit configured to generate potential voltages substantially equal to respective potential voltages of column lines of the PPS array; and
conductor lines formed on the integrated circuit chip, for receiving the respective generated potential voltages from the noise reduction integration circuit, the conductor lines oriented longitudinally in locations corresponding to the respective column lines,
wherein the column lines are formed on top of the respective conductor lines, the column lines configured to transmit the respective potential voltages from the pixel array to the noise reduction integration circuit.

10. A method of reducing noise in a column line of a passive pixel sensor (PPS) array, the method comprising:
detecting a potential voltage of the column line;
adjusting a potential voltage to substantially equal the potential voltage of the column line; and
transferring the adjusted potential voltage along a length of a conductor line which is oriented longitudinally along a length of the column line,
wherein the length of the conductor line is placed at a potential voltage that is the same as the potential voltage of the column line.

11. The method according to claim 10, wherein a parasitic capacitance is formed between the column line and the conductor line and the step of transferring the adjusted potential voltage includes substantially reducing a charge collection by the parasitic capacitance.

12. The method according to claim 10, further including:
receiving a voltage reset potential; and
transferring the voltage reset potential along the length of the conductor line.

13. The method according to claim 10, wherein the potential voltage of the conductor line corresponding to a charge collected by one or more passive pixel sensors of the PPS array, the method further including integrating the collected charge.

* * * * *